(12) United States Patent
Cobb

(10) Patent No.: US 7,516,764 B1
(45) Date of Patent: Apr. 14, 2009

(54) COLOR CHANGING SYSTEM FOR VEHICLE

(76) Inventor: Kendel P. Cobb, 2100 Country Club Rd., Apt. #303, Jacksonville, NC (US) 28546

( * ) Notice: Subject to any disclaimer, the term of this patent is extended or adjusted under 35 U.S.C. 154(b) by 0 days.

(21) Appl. No.: 11/861,554

(22) Filed: Sep. 26, 2007

(51) Int. Cl.
*B67C 3/00* (2006.01)
*G09F 19/20* (2006.01)
*B62D 33/08* (2006.01)
*B05D 1/00* (2006.01)

(52) U.S. Cl. .................. 141/104; 141/98; 141/325; 40/406; 40/591; 296/181.1; 427/401

(58) Field of Classification Search .................. 141/98, 141/100, 104, 105, 325; 40/406, 591; 296/181.1; 427/401
See application file for complete search history.

(56) References Cited

U.S. PATENT DOCUMENTS

| | | | |
|---|---|---|---|
| 3,709,770 A * | 1/1973 | Hale | 296/1.08 |
| 4,144,663 A | 3/1979 | Saenger et al. | |
| 4,917,643 A * | 4/1990 | Hippely et al. | 428/913 |
| 5,075,992 A * | 12/1991 | Kahn | 40/406 |
| 5,340,623 A * | 8/1994 | Menjo et al. | 40/591 |
| D373,982 S | 9/1996 | Rodrigues | |
| 5,617,657 A | 4/1997 | Kahn | |
| 5,636,669 A | 6/1997 | Price | |
| D384,674 S | 10/1997 | Grolle et al. | |

* cited by examiner

*Primary Examiner*—Timothy L Maust
*Assistant Examiner*—Nicolas A Arnett
(74) *Attorney, Agent, or Firm*—Crossley Patent Law; Mark A. Crossley

(57) ABSTRACT

A color changing system for a vehicle that allows an individual to change the visible color of a vehicle by using a plurality of paints inserted in between a pair of transparent layers that are attached to multiple portions of the vehicles. The paints are located within a reservoir unit that has a number of holding tanks, with the holding tanks including holding tanks for the primary colors red, blue, and yellow. In addition, a mixing tank unit includes a series of mixing tanks in which paints are transferred to after leaving the holding tanks but before entering a gap area located in between the pair of transparent layers. The mixing areas hold either primary colors, unmixed, or the primary colors after they have been mixed. A series of mixing tank pumps then pump the resulting mixtures into the gap area in between the pair of transparent layers.

7 Claims, 4 Drawing Sheets

COLOR CHANGING SYSTEM FOR VEHICLE

TO ALL WHOM IT MAY CONCERN

Be it known that I, Kendel P. Cobb, citizen of the United States, have invented new and useful improvements in a color changing system for a vehicle as described in this specification.

BACKGROUND OF THE INVENTION

The present invention concerns that of a new and improved color changing system for a vehicle that allows an individual to change the visible color of a vehicle by using a plurality of paints inserted in between a pair of transparent layers that are attached to multiple portions of the vehicles.

DESCRIPTION OF THE PRIOR ART

U.S. Pat. No. 5,636,669, issued to Price, discloses a selective coloring system which comprises a hollow transparent panel and plurality of separate different colored materials.

U.S. Pat. No. 4,144,663, issued to Saenger et al., discloses a sign which is changeable by selectively delivering and removing an opaque liquid from a reservoir into a transparent cavity.

U.S. Pat. No. 5,617,657, issued to Kahn, discloses a multi-liquid display system which comprises a transparent conduit and system for sequentially circulating liquids of different color.

U.S. Pat. No. D384,674, issued to Grolle et al., discloses a design for a pump.

U.S. Pat. No. D373,982, issued to Rodrigues, discloses a design for a hollow panel with means to introduce and remove colored material.

SUMMARY OF THE INVENTION

The present invention concerns that of a new and improved color changing system for a vehicle that allows an individual to change the visible color of a vehicle by using a plurality of paints inserted in between a pair of transparent layers that are attached to multiple portions of the vehicles. The paints are located within a reservoir unit that has a number of holding tanks, with the holding tanks including holding tanks for the primary colors red, blue, and yellow. In addition, a mixing tank unit includes a series of mixing tanks in which paints are transferred to after leaving the holding tanks but before entering a gap area located in between the pair of transparent layers. The mixing areas hold either primary colors, unmixed, or the primary colors after they have been mixed. A series of mixing tank pumps then pump the resulting mixtures into the gap area in between the pair of transparent layers.

There has thus been outlined, rather broadly, the more important features of a color changing system for a vehicle that the detailed description thereof that follows may be better understood and in order that the present contribution to the art may be better appreciated. There are, of course, additional features of the color changing system for a vehicle that will be described hereinafter and which will form the subject matter of the claims appended hereto.

In this respect, before explaining at least one embodiment of the color changing system for a vehicle in detail, it is to be understood that the color changing system for a vehicle is not limited in its application to the details of construction and to the arrangements of the components set forth in the following description or illustrated in the drawings. The color changing system for a vehicle is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present color changing system for a vehicle. It is important, therefore, that the claims be regarded as including such equivalent constructions insofar as they do not depart from the spirit and scope of the present invention.

It is therefore an object of the present invention to provide a color changing system for a vehicle which has all of the advantages of the prior art and none of the disadvantages.

It is another object of the present invention to provide a color changing system for a vehicle which may be easily and efficiently manufactured and marketed.

It is another object of the present invention to provide a color changing system for a vehicle which is of durable and reliable construction.

It is yet another object of the present invention to provide a color changing system for a vehicle which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
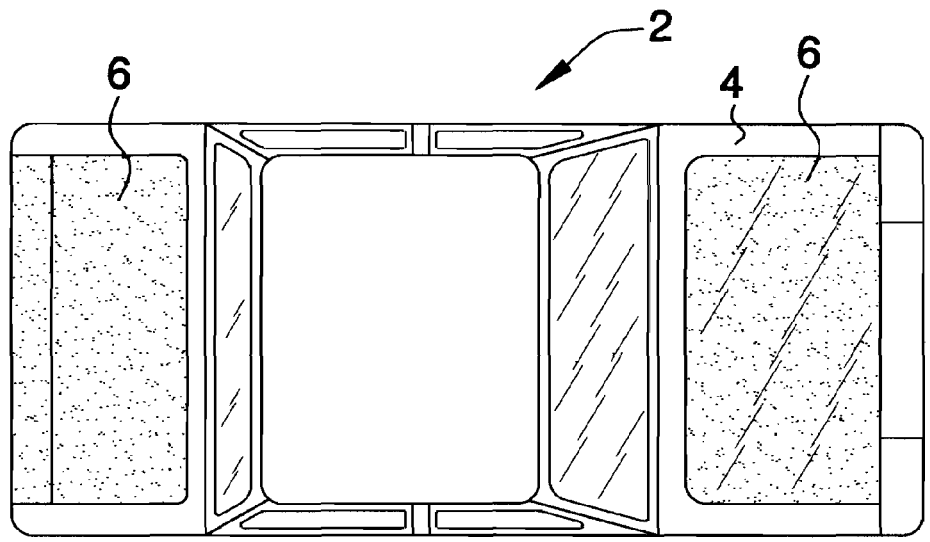
FIG. 1 shows a top view of a vehicle with an incorporated color changing system.
Figure 2:
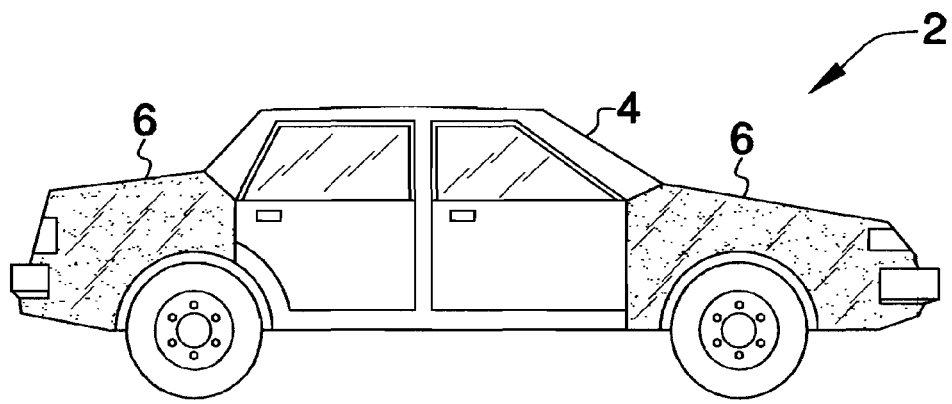
FIG. 2 shows a side view of a vehicle with an incorporated color changing system.
Figure 3:
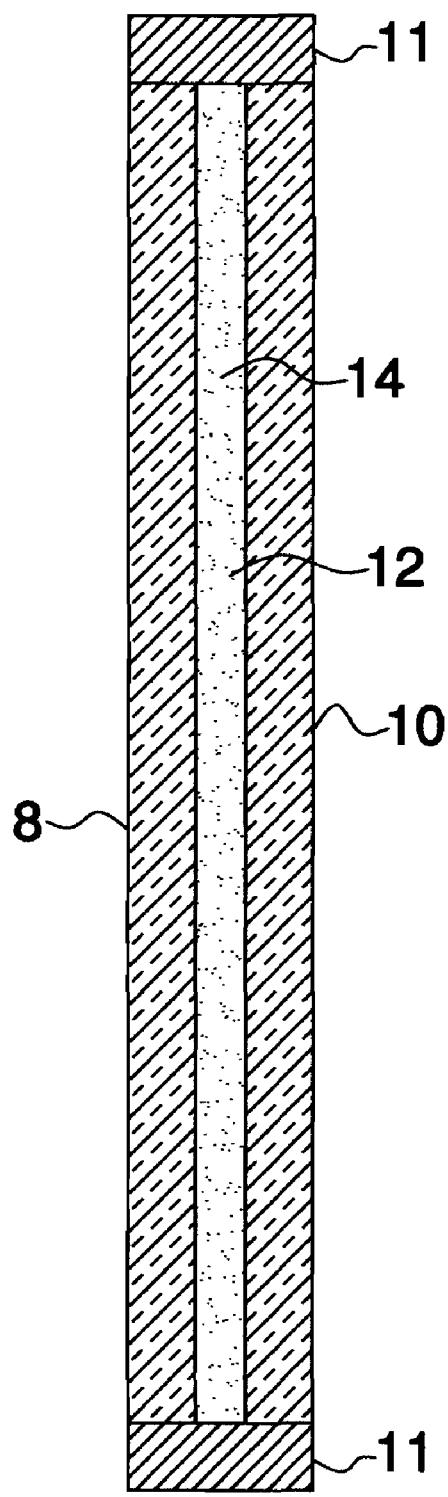
FIG. 3 shows a side view of the two transparent layers and the gap area in between the two transparent layers.

With reference now to the drawings, and in particular to FIGS. 1 through 5 thereof, a new color changing system for a vehicle embodying the principles and concepts of the present invention and generally designated by the reference numeral 2 will be described.

As best illustrated in FIGS. 1 through 5, the color changing system for a vehicle 2 is connected to a vehicle 4. The system 2 comprises a plurality of body panel shells 6, with each shell 6 comprising a pair of transparent panels 8 and 10 that have their ends connected to one another by a connector 11. In between the panels 8 and 10 is a thin gap 12 that is normally filled with air. However, once an individual has chosen a particular paint color or paint color combination, a volume of paint 14 will be forced into each of the gaps 12 on each of the shells 6 attached to the vehicle 4.

Figure 4:
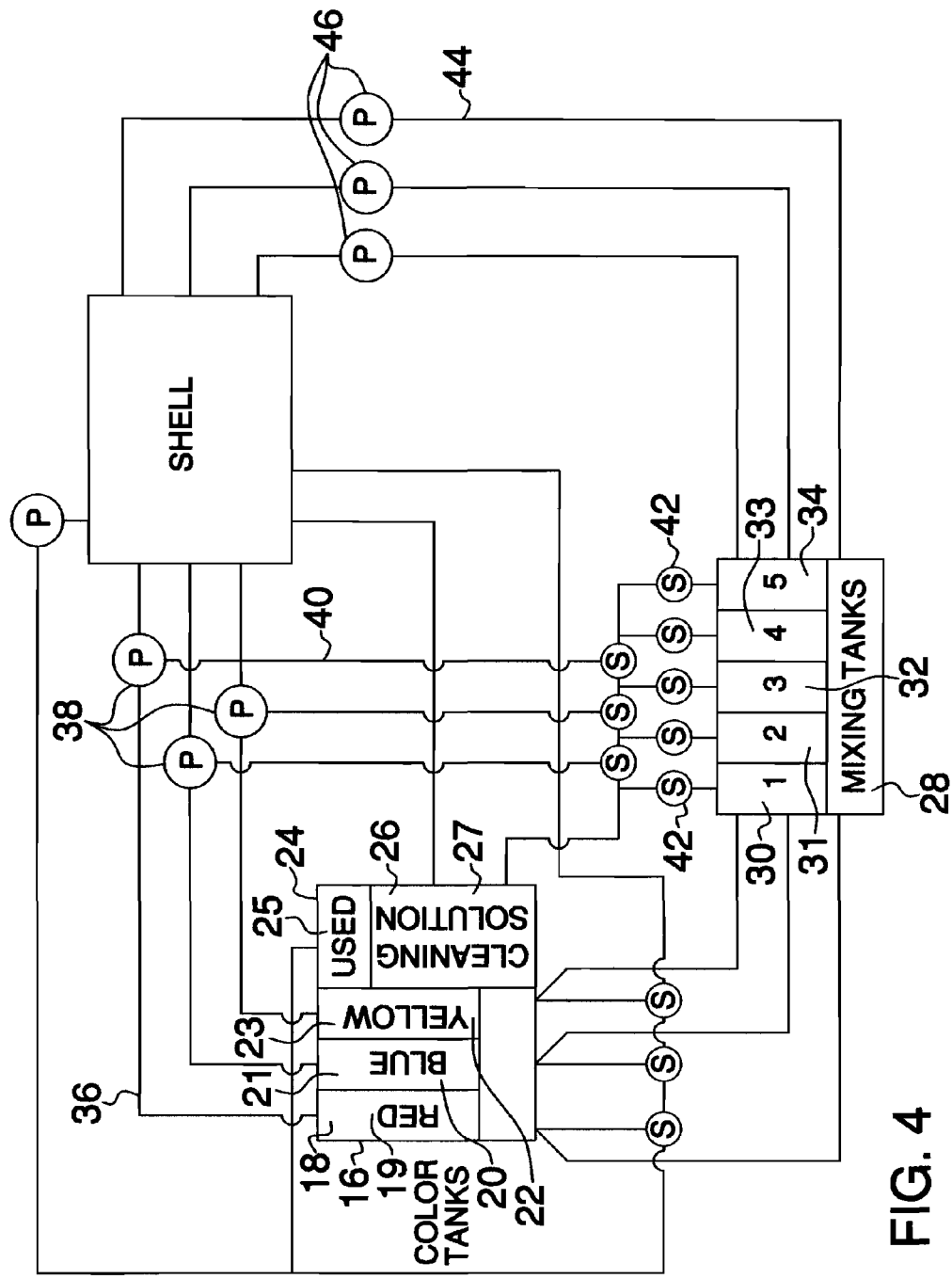
FIG. 4 shows a schematic of the various components of the color changing system for a vehicle.

The system 2, as can be seen in FIG. 4, has many interconnected components. One important component is the reservoir unit 16, which comprises multiple holding tanks including a red paint holding tank 18, a blue paint holding tank 20, a yellow paint holding tank 22, a used paint holding tank 24, and a cleaning solution holding tank 26. The red paint holding tank 18 includes a volume of red paint 19, while the blue paint holding tank 20 includes a volume of blue paint 21. Furthermore, the yellow paint holding tank 22 includes a volume of yellow paint 23. The used paint holding tank 24 includes a volume of used paint 25, while the cleaning solution holding tank 26 includes a volume of cleaning solution 27.

The paint 14 within each of the holding tanks exits each respective holding tank through an attached reservoir unit exit line 36, with the movement of the paint 14 through each reservoir unit exit line 26 being powered by a primary pump 38. One reservoir unit exit line 36 is associated with each holding tank within the reservoir unit 16, with one primary pump 38 being associated with each reservoir unit exit line 36. If the color desired within the gap 12 is one of the three primary colors (red, blue, or yellow), the requested paint 14 passes through the entire length of the appropriate reservoir unit exit line 36 all the way to the body panel shell 6, where it enters the gap 12.

If an individual chooses a color that is not exactly one of the primary colors, then the system 2 will intermix two or three of the primary colors to arrive at the desired color. In such a situation, the paint will be pumped by the primary pumps 38 through a series of transfer lines 40 rather than onward straight into the body panel shell 6. The paint, after running through the transfer lines 40, will pass through a series of switches 42 into the mixing tank unit 28. The mixing tank unit 28 preferably comprises at least five separate mixing tanks 30-34, with each mixing tank holding one particular "mixture" of paints (desired color) that is chosen by an individual within the vehicle 4.

After the paints are mixed within the mixing tank unit 28, a series of mixing tank pumps 46 will pump the resulting paint mixture through one of a plurality of mixing tank exit lines 44, which is connected to the body panel shell 6. One mixing tank exit line 44 is attached to each mixing tank 30-34. The mixture will then enter into the gap 12 within the body panel shell 6.

Figure 5:
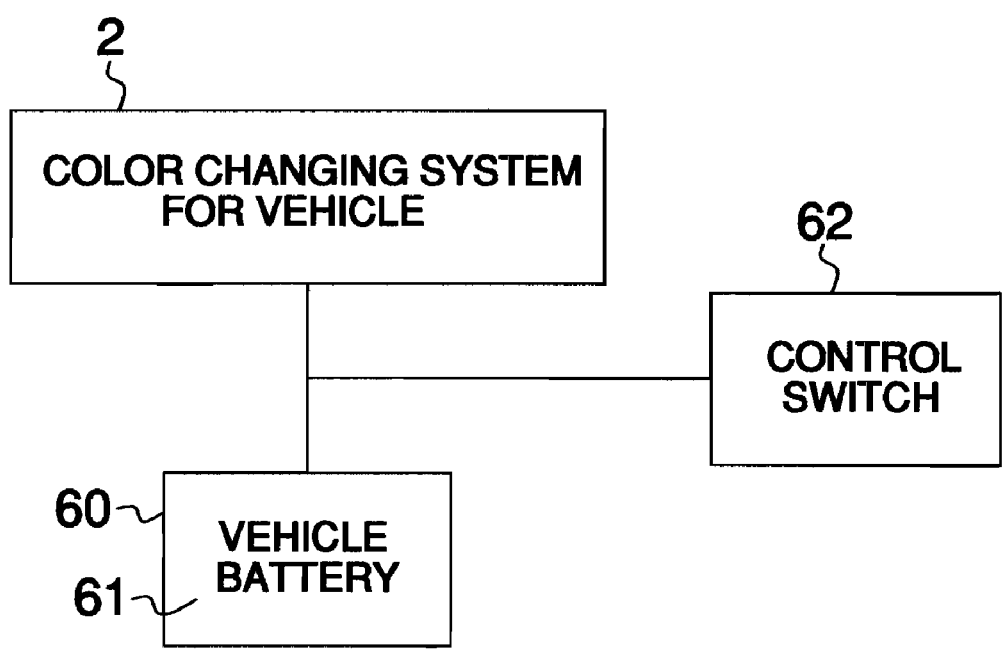
FIG. 5 shows a schematic highlighting the connectivity of the power means and the control switch in relation to the color changing system for a vehicle.

FIG. 5 shows the system 2 as it is powered by power means 60, which is preferably a vehicle battery 61. Each pump within the system 2 would receive power through the vehicle battery 61. A control switch 62, located within the vehicle 4, acts as a circuit in between the power means 60 and the system 2 and allows a user to both turn the system 2 on and off and also to allow the individual to choose a particular paint color that will get pumped into the gap 12 within the body panel shell 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention

What I claim as my invention is:

1. A color changing system for a vehicle in combination with a vehicle, the color changing system for a vehicle comprising
    at least one body panel shell, the body panel shell being attached to the vehicle,
    a volume of paint,
    means for inserting the paint into the body panel shell,
    wherein the body panel shell further comprises
        a first transparent shell,
        a second transparent shell, the second transparent shell being attached to the first transparent shell,
        a gap in between the first transparent shell and the second transparent shell,
    wherein the volume of paint further comprises
        a volume of red paint contained within the system,
        a volume of blue paint contained within the system,
        a volume of yellow paint contained within the system,
    wherein the means for inserting the paint into the body panel shell further comprises
        a reservoir unit located within the system,
        a mixing tank unit located within the system,
        means for connecting the reservoir unit to the mixing tank unit,
        means for connecting the reservoir unit to the body panel shell,
        means for connecting the mixing tank unit to the body panel shell,
    wherein the reservoir unit further comprises
        a red paint holding tank for holding the volume of red paint,
        a blue paint holding tank for holding the volume of blue paint,
        a yellow paint holding tank for holding the volume of yellow paint,
        a used paint holding tank,
        a volume of used paint located within the used paint holding tank,
        a cleaning solution holding tank, and
        a volume of cleaning solution located within the cleaning solution holding tank.

2. A color changing system for a vehicle according to claim 1 wherein the mixing tank unit further comprises
    (a) a plurality of mixing tank units,
    (b) wherein each mixing tank unit is used to mix a separate mixture of paints from two or more of the group consisting of the volume of red paint, the volume of blue paint, and the volume of yellow paint.

3. A color changing system for a vehicle according to claim 2 wherein the means for connecting the reservoir unit to the body panel shell further comprises
    (a) a plurality of reservoir unit exit lines, wherein each reservoir unit exit line is connected to the reservoir unit,
    (b) a plurality of primary pumps, wherein one pump is associated with each reservoir unit exit line,
    (c) power means for providing power to each of the primary pumps,
    (d) wherein each reservoir unit exit line is connected to the body panel shell.

4. A color changing system for a vehicle according to claim 3 wherein the means for connecting the reservoir unit to the mixing tank unit further comprises
    (a) a plurality of reservoir unit exit lines, wherein each reservoir unit exit line is connected to the reservoir unit,
    (b) a plurality of primary pumps, wherein one pump is associated with each reservoir unit exit line, (c) a plurality of transfer lines, wherein each transfer line is connected to a primary pump, further wherein each transfer line is connected to a mixing tank within the mixing tank unit.

5. A color changing system for a vehicle according to claim 4 wherein the means for connecting the mixing tank unit to the body panel shell further comprises (a) a plurality of mixing tank exit lines, wherein one mixing tank exit line is attached to each mixing tank,
   (b) a plurality of mixing tanks pumps, wherein one mixing tank pump is associated with each mixing tank exit line,
   (c) power means for providing power to each mixing tank pump,
   (d) wherein each reservoir unit exit line is connected to the body panel shell.

6. A color changing system according to claim 5 wherein the power means for providing power to the primary pumps and the power means for providing power to the mixing tank pumps further comprises a vehicle battery, the vehicle battery located within the vehicle.

7. A color changing system according to claim 6 wherein the system further comprises (a) a control switch, the control switch being located within the vehicle,
   (b) wherein the control switch acts as a circuit in between the vehicle battery and the pumps within the system, and
   (c) further wherein an individual can choose a particular paint color to be mixed and subsequently inserted into the gap located within the body panel shell.

* * * * *